US008234561B1

(12) United States Patent
Bourdev

(10) Patent No.: US 8,234,561 B1
(45) Date of Patent: Jul. 31, 2012

(54) AUTOCOMPLETING FORM FIELDS BASED ON PREVIOUSLY ENTERED VALUES

(75) Inventor: Lubomir D. Bourdev, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 1516 days.

(21) Appl. No.: 11/687,609

(22) Filed: Mar. 16, 2007

Related U.S. Application Data

(63) Continuation of application No. 10/306,368, filed on Nov. 27, 2002, now Pat. No. 7,343,551.

(51) Int. Cl.
G06F 17/00 (2006.01)
(52) U.S. Cl. .................. 715/224; 715/225; 715/226
(58) Field of Classification Search .............. 715/224, 715/225, 226
See application file for complete search history.

(56) References Cited

U.S. PATENT DOCUMENTS

| 6,564,213 | B1* | 5/2003 | Ortega et al. ................ 1/1 |
| 6,651,217 | B1* | 11/2003 | Kennedy et al. ............ 715/224 |
| 6,922,810 | B1* | 7/2005 | Trower et al. ............... 715/256 |
| 6,978,275 | B2* | 12/2005 | Castellanos et al. ............ 1/1 |
| 7,136,490 | B2* | 11/2006 | Martinez et al. ............ 380/284 |
| 7,184,950 | B2* | 2/2007 | Weise ........................... 704/9 |
| 7,512,654 | B2* | 3/2009 | Tafoya et al. ............... 709/204 |
| 7,694,216 | B2* | 4/2010 | Billings et al. ............. 715/221 |
| 7,788,603 | B2* | 8/2010 | Lu et al. .................... 715/826 |
| 8,095,597 | B2* | 1/2012 | Rawat et al. ............... 709/206 |
| 2002/0062342 | A1 | 5/2002 | Sidles |
| 2002/0083068 | A1* | 6/2002 | Quass et al. ............... 707/100 |
| 2003/0033288 | A1* | 2/2003 | Shanahan et al. ............. 707/3 |

OTHER PUBLICATIONS

Website for Microsystems Technology, AnyForm™ for Invoices, "Invoices Driving Your Crazy?", pp. 1-2, printed Nov. 9, 2002.
Website for Microsystems Technology, AnyForm™ for Invoices, "What AnyForm Isn't", pp. 1-2, printed Nov. 9, 2002.
Website for Microsystems Technology, AnyForm™ for Invoices, "How AnyForm Works", pp. 1-2, printed Nov. 9, 2002.
Website for Microsystems Technology, AnyForm™ for Invoices, "AnyForm Learns the More You Use It?", pp. 1-2, printed Nov. 9, 2002.
Website for Microsystems Technology, AnyForm™ for Invoices, "Single Software Solution", pp. 1-2, printed Nov. 9, 2002.
Website for ScanSoft®, Productivity Without Boundaries™, p. 1, printed Nov. 4, 2002.
Website for ScanSoft®, Productivity Without Boundaries™, OmniForm 5.0, pp. 1-2, printed Nov. 4, 2002.

(Continued)

Primary Examiner — Stephen Hong
Assistant Examiner — Matthew Ludwig
(74) Attorney, Agent, or Firm — Fish & Richardson P.C.

(57) ABSTRACT

Systems and techniques for autocompleting form fields based on observed values. In general, in one implementation, the techniques include observing values entered in form field objects, generating likelihood assessments for possible values to be entered in a current form field object based on the observed values, the likelihood assessments indicating relative probability of the possible values being entered in the current form field object, and predicting a value for the current form field object based on the generated likelihood assessments. The techniques also include generating at least two likelihood assessments for each of the possible values, and aggregating the at least two likelihood assessments for each of the possible values. Generation of likelihood assessments can involve determining semantic similarity between form fields, including comparing field names with a semantic category, and generation of likelihood assessments can also involve comparing entered value ordering information. Value prediction display techniques are also provided.

92 Claims, 3 Drawing Sheets

OTHER PUBLICATIONS

Website for ScanSoft®, Productivity Without Boundaries™, OmniForm 5.0, "The Complete Business Solution", p. 1, printed Nov. 4, 2002.
Website for ScanSoft®, Productivity Without Boundaries™, OmniForm 5.0, "Key Features", pp. 1-2, printed Nov. 4, 2002.
Website for ScanSoft®, Productivity Without Boundaries™, OmniForm 5.0, "Datasheets", p. 1, printed Nov. 4, 2002.
Website for ScanSoft®, Productivity Without Boundaries™, OmniForm 5.0, "Quickly and Accurately Make Your Paper Forms Digital!", p. 1, printed Nov. 4, 2002.
Website for ScanSoft®, Productivity Without Boundaries™, OmniForm 5.0, "Increase Productivity and Performance in Your Organization", p. 1, printed Nov. 4, 2002.
Website for ScanSoft®, Productivity Without Boundaries™, OmniForm 5.0, "Easily Convert Paper Forms to Digital or Create Your Own From Scratch!", p. 1, printed Nov. 4, 2002.
Website for ScanSoft®, Productivity Without Boundaries™, OmniForm 5.0, "Increase Productivity—Save Time and Money", p. 1, printed Nov. 4, 2002.

* cited by examiner

AUTOCOMPLETING FORM FIELDS BASED ON PREVIOUSLY ENTERED VALUES

CROSS-REFERENCE TO RELATED APPLICATIONS

This application is a continuation of and claims the benefit of the priority of U.S. patent application Ser. No. 10/306,368 filed Nov. 27, 2002 now U.S. Pat. No. 7,343,551, which is hereby incorporated by reference.

BACKGROUND OF THE INVENTION

The present application describes systems and techniques relating to data entry in electronic forms.

Conventional electronic forms include multiple fields, which can be used to enter multiple types of data for later use. Such forms are widely used in computer networks as a mechanism to collect information for use in business, industry, and many other areas of endeavor. These forms can be provided in different formats, such as in Hypertext Markup Language (HTML) or PORTABLE DOCUMENT FORMAT (PDF) developed by Adobe Systems Incorporated of San Jose, Calif. In general, a form field is identified by a name, which denotes the form field object in an instance of the form.

Some forms can receive values without requiring a user to type the values. A form can include specified default values for form fields. A form can have functionality built into the form that allows a form field to take a value calculated from values entered elsewhere. A traditional form filling interface can keep track of values entered in particular fields in a specific form from a particular source, and then propose those values in the future when that same particular field in the specific form from the particular source is seen again. Such proposed values are typically presented in a pull-down list and ordered in the list alphabetically. As a user types characters into the particular field, the alphabetical list is reduced based on the characters typed.

Moreover, data can be imported into a form. For example, Forms Data Format (FDF) is a data representation format developed by Adobe Systems Incorporated to allow importing of data into an existing PDF document. FDF files may be used to submit data to a server, or to receive data from a server. FDF Toolkit is an application program interface (API) developed by Adobe Systems Incorporated to facilitate the writing of server applications to generate and/or parse FDF data from a form created by the Adobe ACROBAT® Forms plug-in.

Despite these features of traditional forms, users still often need to enter the same values in equivalent fields in different forms. For example, a user often needs to type in name and address information in each different form they fill out, such as when registering with a Web site. One attempt to address this problem has been to define a standard for commonly used field names, and then allow the user to retain the commonly used values in a file for importing into a form when those standardized field names are recognized. For example, the Personal Form Names (PFN) standard specifies personal information such as name, address, social security number (SSN), telephone number, etc. The user enters this personal information once and then uploads it to any PFN-conforming form.

SUMMARY OF THE INVENTION

In general, in one aspect, the invention features a system including an input/output system, an auto-fill engine providing proposed values and corresponding likelihood assessments generated based on values entered in observed form fields using the input/output system, the likelihood assessments indicating relative probability of the proposed values being entered in one or more current form field objects in a current form instance, and a form presentation component displaying the current form instance using the input/output system such that one or more predicted values are displayed in connection with the one or more current form field objects, the one or more predicted values being selected from the proposed values based on the likelihood assessments.

The auto-fill engine can provide the proposed values and the corresponding likelihood assessments based on a determination of semantic similarity among the one or more current form field objects and the observed form fields. The determination of semantic similarity can involve a comparison of the one or more current form field objects and the observed form fields with a semantic category. The auto-fill engine can further provide the proposed values and the corresponding likelihood assessments based on a comparison of tab order information for values entered in the current form instance with tab order information for the values entered in the observed form fields.

The form presentation component can display a predicted value in one of the one or more current form field objects in response to user activation of the one of the one or more current form field objects when a likelihood assessment for the predicted value is a highest of likelihood assessments corresponding to the one of the one or more current form field objects and the likelihood assessment for the predicted value surpasses a threshold. The form presentation component can display a predicted value in one of the one or more current form field objects in response to user activation of and data entry in the one of the one or more current form field objects when a likelihood assessment for the predicted value is a highest of likelihood assessments corresponding to the one of the one or more current form field objects and the predicted value matches the entered data.

The form presentation component can display a list of the proposed values ordered by likelihood assessments in response to user activation of one of the one or more current form field objects, the list being displayed in proximity to the one of the one or more current form field objects. The list of the proposed values can be a list of a subset of the proposed values, the subset being based on a likelihood threshold and a list size limit. The form presentation component can display the one or more predicted values in the one or more current form field objects and can dynamically redisplay new one or more predicted values in response to user input to the current form instance. The form presentation component can be a portion of a machine network browser, such as an Adobe ACROBAT® plug-in to a Web browser.

According to another aspect, the invention can involve observing values entered in form field objects, generating likelihood assessments for possible values to be entered in a current form field object based on the observed values, the likelihood assessments indicating relative probability of the possible values being entered in the current form field object, and predicting a value for the current form field object based on the generated likelihood assessments. Generating likelihood assessments can involve generating at least two likelihood assessments for each of the possible values, and aggregating the at least two likelihood assessments for each of the possible values. Furthermore, the invention can involve adjusting operating parameters to improve form field value prediction.

Generating likelihood assessments can involve determining a semantic similarity between the current form field object and a form field for which values have been observed, and generating a likelihood assessment for a possible value based on the observed values for the form field and the determined semantic similarity. Determining a semantic similarity can involve comparing the current form field object and the form field with a semantic category. Determining a semantic similarity can further involve determining a semantic similarity between a name of the current form field object and a name of the form field, the semantic similarity being proportional to a degree of match of the names to the semantic category.

Determining a semantic similarity can involve comparing a name of the current form field object with a name of the form field. Comparing a name of the current form field object with a name of the form field can involve comparing a previously unobserved name of the current form field object with the name of the form field.

Determining a semantic similarity can involve comparing the observed values with each other. The semantic similarity can be proportional to a ratio of a first quantity and a second quantity, the first quantity being a number of values observed in both the form field and a form field to which the current form field object corresponds, and the second quantity being the first quantity plus a number of values observed in only one of the two form fields. Additionally, generating a likelihood assessment for a possible value can involve generating a likelihood assessment that is proportional to the semantic similarity and to a frequency of use of the possible value in the form field.

Observing values entered in form field objects can involve storing order information for the observed values; and generating likelihood assessments for possible values can involve comparing order information for values entered in a current form instance with the stored order information for the observed values. Storing order information for the observed values can involve retaining form tab order information for the observed values. Generating likelihood assessments for possible values can further involve generating a likelihood assessment for a possible value, the likelihood assessment being proportional to a degree of match between a first ordered set and a second ordered set, the first ordered set corresponding to a portion of the stored order information for the possible value, and the second ordered set corresponding to the possible value plus values entered in the current form instance before the current form field object.

The generated likelihood assessments can be adjusted based on a determined characteristic of the current form field object. The determined characteristic of the current form field object can be a determined type for previously entered values. The determined characteristic of the current form field object can be a field type distribution indicating probabilities that the current form field object is of a given type. The field type distribution for the current form field object can be based on a determination of semantic similarity between the current form field object and a form field for which values have been observed. The determined characteristic of the current form field object can be a determined field predictability of a form field to which the current form field object corresponds. The determined field predictability can be determined based on a degree of past successful value prediction for the form field. Alternatively, the determined field predictability can be determined based on a ratio of a number of past values entered in the form field and a number of past unique values entered in the form field.

The generated likelihood assessments can be adjusted based on a determined characteristic of the possible values. The determined characteristic of the possible values can be frequency of common session use for the possible values in relation to values already entered in a current form instance.

Predicting a value for the current form field object can involve receiving user input activating the current form field object and entering one or more characters, and in response to the user input, displaying a selected value in the current form field object, the selected value being a value from the possible values with a highest likelihood assessment that also matches the one or more characters. Predicting a value for the current form field object can involve receiving user input activating the current form field object, and in response to the user input, displaying a selected value in the current form field object, the selected value being a value from the possible values with a highest likelihood assessment. Predicting a value can further involve checking that the highest likelihood assessment is greater than a threshold before displaying the selected value.

Predicting a value for the current form field object can involve displaying a list of the possible values ordered by the likelihood assessments. Displaying a list of the possible values can involve displaying a list of a subset of the possible values, the subset being based on a likelihood threshold and a list size limit.

Generating likelihood assessments can involve generating likelihood assessments for possible values to be entered in multiple current form field objects in a current form instance. Predicting a value can involve predicting multiple values for the multiple current form field objects in the current form instance, predicting multiple values can involve displaying values selected from the possible values in the multiple current form field objects, and displaying a new value in place of one of the displayed values in one of the multiple current form field objects in response to user input, the new value being a predicted value based on generated likelihood assessments and the user input.

The invention can be implemented to realize one or more of the following advantages. Commonly entered form data can be automatically placed into new forms; specific rules for creating and tagging new forms are not required. The techniques can be used with existing forms, with no need to change tags, scripts, or workflows that rely on tags that do not conform to any particular standard, such as PFN. Additional work by the user, such as in creating and importing a profile, and additional knowledge by the user, such as about how to use PFN, are not necessary. The invention is not limited to personal information, and can assist in filling forms with other commonly entered information in any form subject (e.g., an institution, a city, a time period, a vehicle, a book, a compact disc, etc.) without requiring a standard.

The invention can be used by both home and corporate users and works with a wide range of possible field names, including field names that are in different languages. The invention can improve the form fill-in user experience by making it faster and less tedious, taking advantage of information already entered and using it to determine the most likely values for fields that have not yet been completed. Rejecting such suggested values requires no effort by the user, when for example, an auto-fill on-tab mode is enabled. Moreover, the invention can predict a possible value for a form field object having a name that has never been observed previously.

The details of one or more embodiments of the invention are set forth in the accompanying drawings and the descrip-

DETAILED DESCRIPTION

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

The term "form" means an electronic document having a set of form fields for use in collecting information. Two instances of a form, such as two sessions presenting the form, are referred to as two form instances of a single form. A form field is a defined value recipient in a form. A form field has a name, and can also have a value and/or a type (the type may be explicitly defined or may be deduced, such as from entered values). The name identifies the field and the type defines acceptable values that may be received by the form field. The term "form field object" means a form field in an instance of a form. The form field objects in an instance of a form typically have a sequential ordering within the form, such as a tab order.

Figure 1:
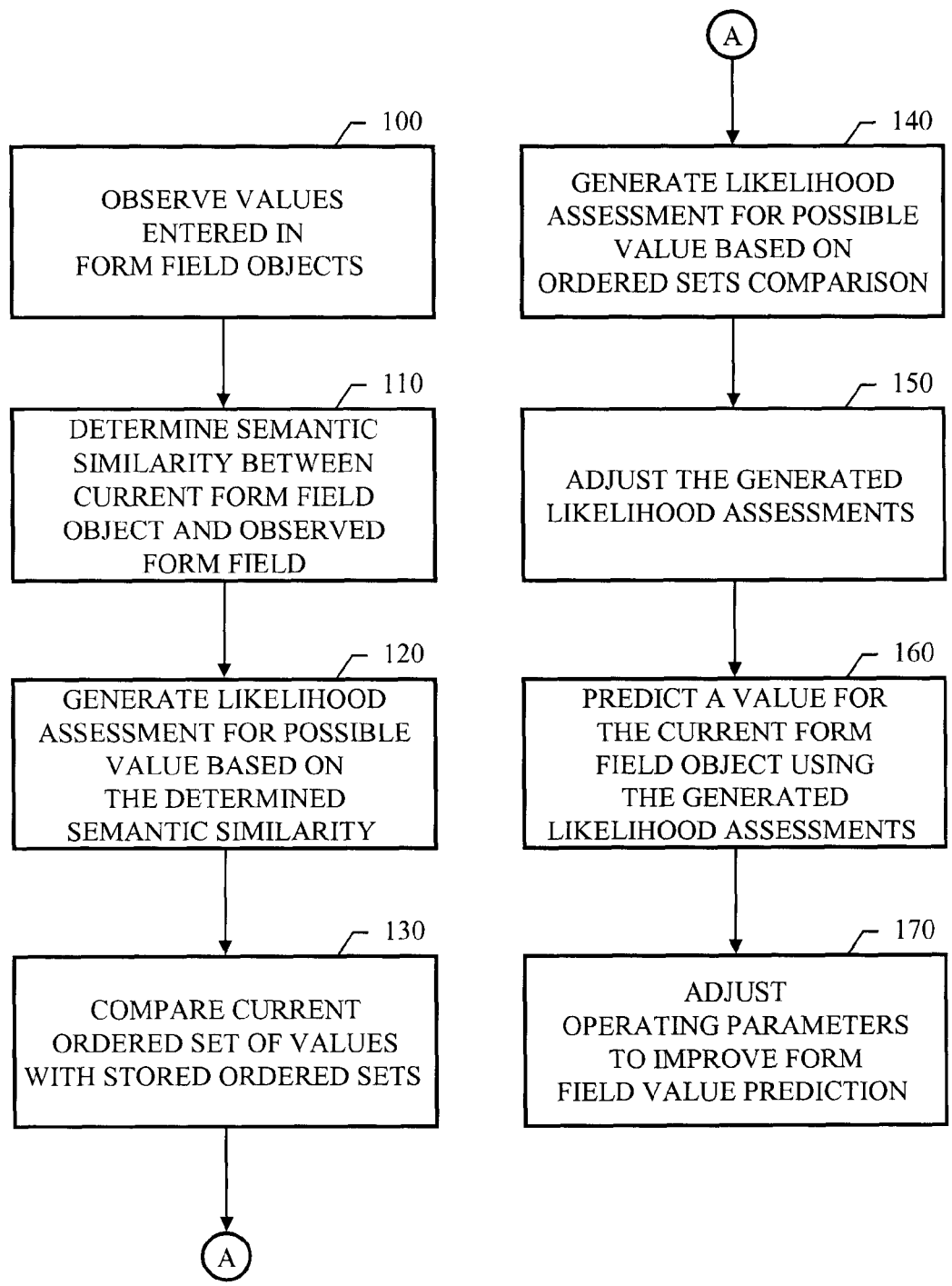
FIG. 1 is a flow chart illustrating form field object value prediction according to one implementation.

FIG. 1 is a flow chart illustrating form field object value prediction according to one implementation. Values entered in form field objects are observed at 100. These entered values and the names of the form field objects in which they are entered are stored for later use in predicting values to be entered. Additionally, observing the entered values can also involve storing information concerning the entered values, such as order information for the entered values (e.g., retaining information concerning the tab order of the observed form field objects in form instances in which the values are entered) and such as recency information for the entered values (e.g., the last session that each value was used in; thus allowing trimming of a database by removing least-recently-used values first). These entered values can be values typed into a form instance by a user, values calculated by functionality built into the form itself, or values entered through another mechanism, such as imported data (e.g., a PFN document can be used to fill in a PFN-conforming portion of a form instance, and the techniques described here can be applied to such imported form data).

One or more current form field objects are identified for a current form instance, and likelihood assessments for possible values to be entered in the current form field object(s) are generated based on the entered values. The possible values can be the entered values themselves, or the possible values can be derived from the entered values (e.g., a heuristic, such as those described below, may determine over time that a field's value tends to be the sum of the values of the previous two fields, even though the field does not include an explicit calculation link with the previous two fields). The likelihood assessments can be generated by multiple heuristics, which can each generate a likelihood assessment using a different approach and specific criteria. For example, two heuristics can generate two likelihood assessments for each possible value, and these two likelihood assessments can then be aggregated into a single likelihood assessment for each possible value.

A semantic similarity between a current form field object and a form field for which values have been observed can be determined at 110. Determining semantic similarities can involve comparing a previously unobserved name of the current form field object with previously observed names for observed form fields. For example, the previously unobserved name and the previously observed names can be compared with a semantic category. Additionally, determining the semantic similarity can involve comparing the previously entered values with each other (e.g., comparing the set of values used in the previously observed field with the set of values used in the current field).

Then, a likelihood assessment for a possible value can be generated based on the previously entered values and the determined semantic similarity at 120. For example, a likelihood assessment can be generated such that the likelihood assessment is proportional to a frequency of use of the possible value in an observed form field and to a semantic similarity between the observed form field and the current form field object. The current form field object can be a current instance of the observed form field, or it can be a current instance of a previously unobserved form field. A semantic similarity generated based on comparing names can be aggregated with a semantic similarity based on comparing values, and this aggregated semantic similarity can be used to generate a likelihood assessment. Alternatively, likelihood assessments can be generated based on both a comparison of names and a comparison of values, and these two likelihood assessments can be aggregated into a single likelihood assessment governed by semantic similarity.

An ordered set of values entered in the current form instance can be compared with stored ordered sets of the previously entered values at 130. For example, tab order information for the entered values can be compared with tab order information for values entered in the current form instance. A likelihood assessment can then be generated based on the ordered sets comparison at 140. Thus, a likelihood assessment for a possible value can be generated such that the likelihood assessment is proportional to a degree of match between the ordered set of values that would correspond to using the possible value in the current form field object, and a stored ordered set of previously entered values.

The generated likelihood assessments can be adjusted at 150. This adjustment of the likelihood assessments can be performed using one or more heuristics. These heuristics can serve as filters, adjusting the likelihood assessments based on a determined characteristic of the current form field object (e.g., a field type deduced from previously entered values, or a determined field predictability), and/or a determined characteristic of the possible values (e.g., a determined common session association for the possible values in relation to the previously entered values).

Following the generation of likelihood assessments, a value is predicted for the current form field object using the generated likelihood assessments at 160. This can involve aggregating multiple likelihood assessments generated for each possible value into a single likelihood assessment for each possible value. Such aggregated likelihood assessments can then be compared to arrive at a predicted value for the current form field object.

Moreover, operating parameters can be adjusted to improve form field value prediction at 170. For example, operating parameters for the multiple heuristics can be adjusted based on entered values to maximize prediction accuracy for the heuristics. Such adjustment of operating parameters can be performed periodically using an accumulated set of entered values, or continuously using each value entered in the current form field object after a prediction is made.

Figure 2:
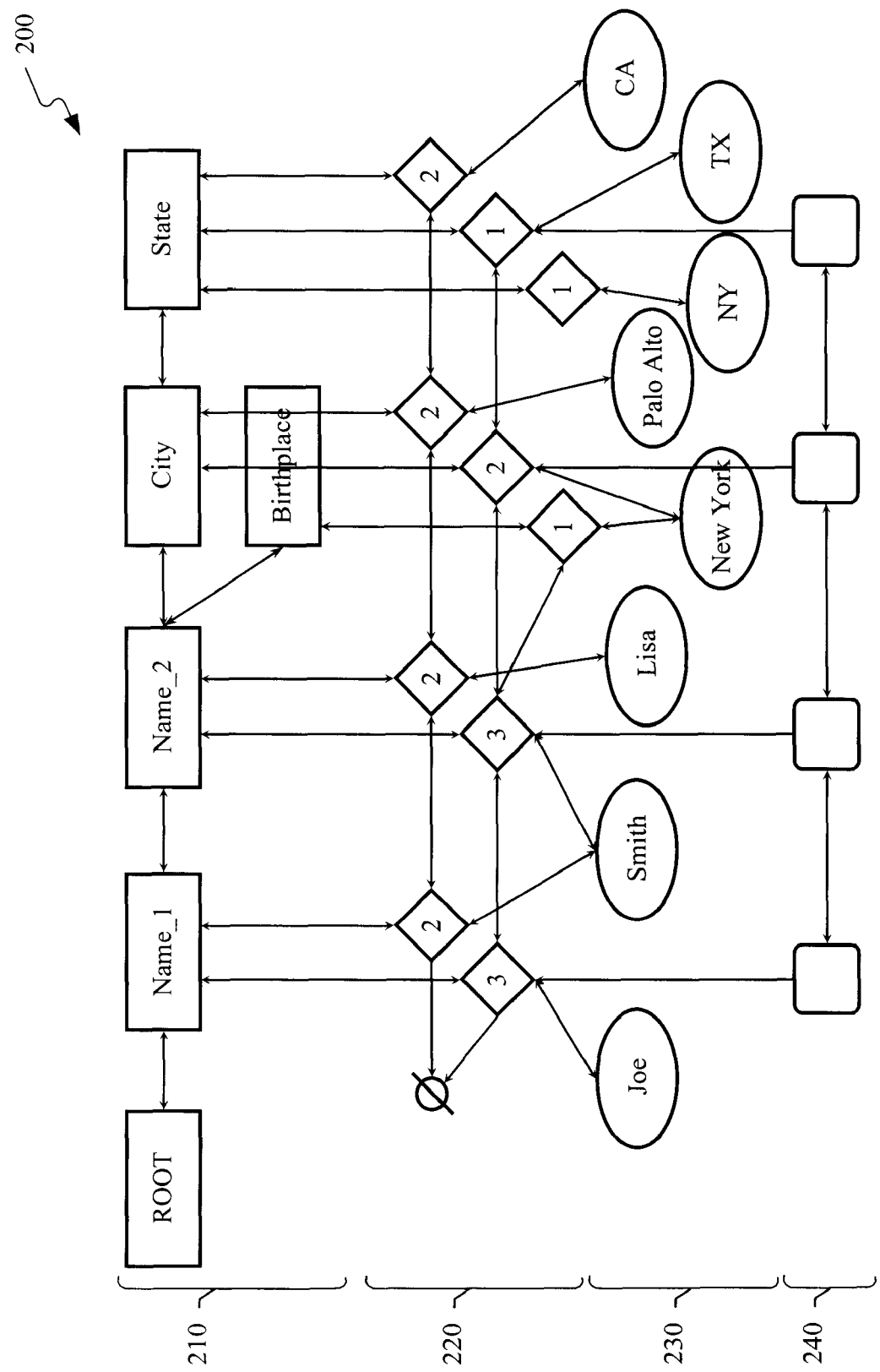
FIG. 2 illustrates an example data structure for use by a forms auto-fill engine implementing form field object value prediction.

FIG. 2 illustrates an example data structure 200 for use by a forms auto-fill engine implementing form field object value prediction. Alternative implementations can use the data structure 200 and/or other data structures. A form can include one or more form fields ordered in tab order, and each field can have a name stored as a character string (e.g. a tag name). When filling the form, the user enters values (e.g., character strings) in one of more of the fields. The process of filling form field objects in a form instance is hereafter called a session. Each session can be assigned a unique identifier, session ID, (e.g., each unique identifier can be taken from the sequence of natural numbers). An entry represents a given value entered in a given form field object during a given session.

The fields, entries and values encountered previously can be stored in a database inside the engine using a structure as shown in FIG. 2. The data structure 200 represents the database after entry of the following form data in arbitrary order:

1. {"Name_1"->"Smith"}, {"Name_2"->"Lisa"}, {"City"->"Palo Alto"}, {"State"->"CA"}
2. {"Name_1"->"Smith"}, {"Name_2"->"Lisa"}, {"City"->"Palo Alto"}, {"State"->"CA"}
3. {"Name_1"->"Joe"}, {"Name_2"->"Smith"}, {"City"->"New York"}, {"State"->"NY"}
4. {"Name_1"->"Joe"}, {"Name_2"->"Smith"}, {"Birthplace"->"New York"}
5. (CURRENT) {"Name_1"->"Joe"}, {"Name_2"->"Smith"}, {"City"->"New York"}, {"State"->"TX"}

Where each numbered line represents a session (the fifth session being the current session), and where the entered data is represented as {data}, {data}, . . . , with "data" having the format: "Form_Field_Name"->"Value_Entered_For_This_Form_Field_Name". In this example, Lisa Smith is Joe Smith's daughter.

A fields portion 210 of the structure 200 can be a tree structure representing the observed fields. There is one global "Root" field. Each stored field has a pointer to the previous field in tab order (or to the root field, if first). Two fields are considered the same, and represented as a single object in the structure 200, if they have the same field names, and all of their previous fields in tab order are the same. If the same form is used in multiple different sessions, its fields are stored only once. Additionally, the first few fields of different forms can also be stored together if they happen to have the same field names. Sessions 1 and 4 in the example use different forms but most fields are shared. Thus, the fields can be stored in a tree 210 such that each form corresponds to a path from the root to a leaf of that tree. Each field also has pointers to its children, which are the next fields in tab order, if any. To be kept in the database a field should have at least one entry.

Each field has a set of one or more entries stored in an entries portion 220 of the structure 200. An entry has pointers to the field it is used in, the value it is used with (or NULL if none), and the previous entry in tab order, (or NULL if first). The entry also keeps track of the number of sessions it has been used in (e.g., a session count as shown). Two entries are considered the same, and represented as a single object, if they have the same field, the same value, and the same previous entry, if any. Thus, if a user enters the same value in the same field, with the same sequence of previous values, the corresponding entry's session count is incremented, instead of a new entry being created. Each entry also has a pointer to the next entry in tab order, if any. To be kept in the database, an entry should have either an associated value or next entry.

Values are store in a values portion 230 of the structure 200. Each value has a list of one or more entries in which it has been used (e.g., a linked list of pointers to entries). To be kept in the database, a value should be used by at least one entry. Two values are the same, and are represented with the same object, if their character strings are identical. All values can also be stored in a global set (not shown) in alphabetical order. An empty string is a legal value. The lack of value can be represented by having the entry point to NULL. This may happen if some fields in the form were left empty and unchanged when the form was submitted. If the user explicitly activates a form field object but does not enter a value for it (e.g., tabs through the form field object, or clicks with the mouse inside the field and then tabs away), then the entry's value becomes the empty string. The NULL value can be ignored by the heuristics, while the empty string can be treated just like any other value.

The fields, entries and values shown in the example data structure 200 represent the persistent portion of the database, which can be saved to and loaded from a database storage document. Such saving and loading can be performed using a stream and can employ encryption/decryption for added security. Moreover, the use of the word "portion" in connection with field, entry and value is done for reference purposes only and does indicate a particular storage format in a storage document.

Each currently open form instance can be represented as a temporary layer 240, a mapping of a sequence of entries corresponding to the field objects in the current form. As the user enters values in form field objects of the current form, this can result in creating new stored values, as well as splitting or merging of entries. Such splitting and merging behavior can be recursive and, in certain situations, rather complex. For example, if all entries in the currently open form match previous values, all entries are reused. But if the user changes any value, this can cause the corresponding entry to split (if no other entry has the same new value, field and previous entry), and all subsequent entries then split as well, since their previous entries are no longer the same. If the entry has a count of 1, the entry does not split but rather changes its value, since it is used only in the current session, and if the old value for the entry is not used by any other entry, the old value is eliminated. When the entered value matches an existing one, the existing entry can be reused and the previous entry can be deleted, but only if it is not used by another currently open form.

FIG. 2 shows a single currently open form that has a value entered in each field: {"Name_1"->"Joe"}, {"Name_2"->"Smith"}, {"City"->"New York"}, {"State"->"TX"}. Multiple forms can be opened simultaneously. When a form filling session is completed, the changes made to the persistent portion of the database by the form can be saved, or reverted. This can be done using a reference counting mechanism.

Figure 3:
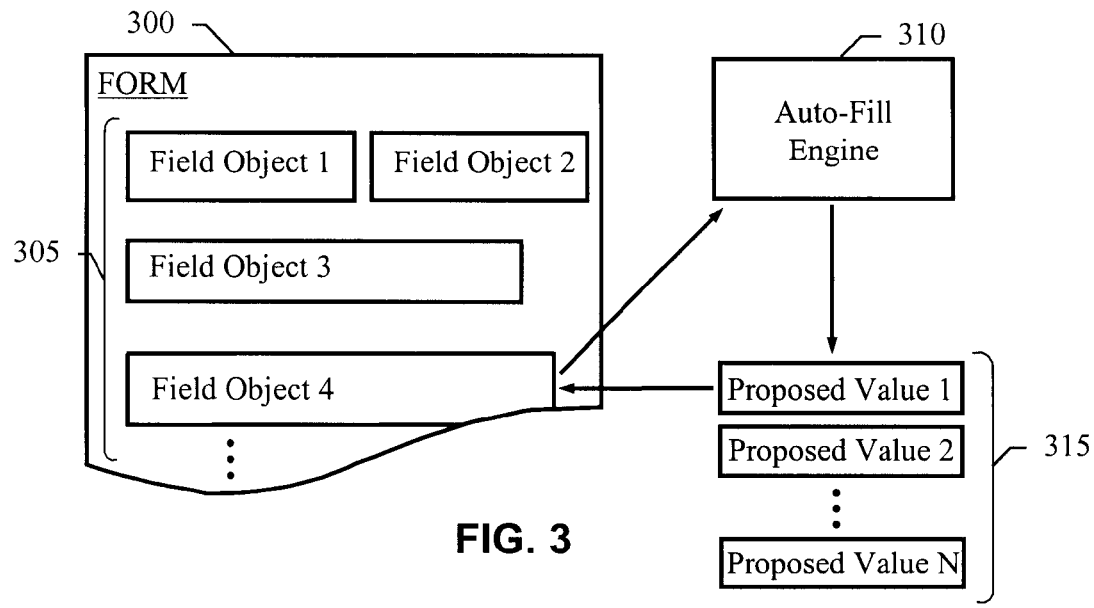
FIG. 3 is a block diagram illustrating interaction of an example forms auto-fill engine with a form instance.

FIG. 3 is a block diagram illustrating interaction of an example forms auto-fill engine 310 with a form instance 300. The form instance 300 includes multiple form field objects 305. The auto-fill engine 310 receives information regarding the form field objects 305 in the form instance 300. Such information can include field name information and entered value information, as well as one or more field objects whose possible default value is to be predicted. The auto-fill engine 310 can generate proposed values 315 for each of the one or more field objects. Each of the proposed values has at least one associated likelihood assessment, and the auto-fill engine 310 can predict at least one value to be entered into a form field object. Predicting the at least one value to be entered into a form field object can be done by the auto-fill engine 310 directly or can involve outputting a list of proposed values and their likelihood assessments. The output list can be processed outside the auto-fill engine 310 to display predicted values.

One or more predicted values can be associated with one or more form field objects in the form instance and can be displayed using multiple techniques. For example, a user interface can provide multiple user-selectable operation modes, which can be used together or separately (i.e., the user can enable multiple different display modes to function together). One display mode can be an auto-complete-field-on-tab mode, in which the proposed value with the highest likelihood assessment, that is also above a threshold, is selected for a form field object. The predicted value is displayed in the field object and is pre-selected in the user interface such that replacing it with another value requires no more keystrokes than typing in an alternative value (i.e. there is zero-penalty rejection). For example, the predicted value can appear in the form field object, and be pre-selected, as soon as the user activates the field (e.g., tabs into the field or selects the field with a mouse). The user can accept the predicted value by just tabbing through the field object to the next field object, and the user can reject the predicted value by typing a different value or deleting the predicted value.

Another display mode can be a pull-down-list mode, in which a list of two or more of the proposed values 315 can be shown, such as with a pull-down menu, and made available for selection. The list of values can be ordered based on the generated likelihood assessments, and the length of the list can be governed by a threshold (i.e., display all proposed values with a likelihood assessment above a threshold), and/or governed by a number N, which may be set by the user, such that the top N of the proposed values are listed, ordered by likelihood assessment.

Another display mode can be an auto-complete-as-you-type mode, in which as the user types characters into a field, those characters are compared with the proposed values to obtain a subset of the proposed values that match the initial characters typed thus far. This subset is then used to predict a value based on the characters already typed. The predicted value can be displayed using the techniques described above, such as by presenting a pull-down list and/or displaying remaining characters of the best proposed value, the remaining characters being pre-selected to provide zero-penalty rejection such as described above.

Various global-auto-complete modes can also be used. Some or all of the empty field objects in a current form instance can be filled with predicted values, either automatically or in response to user direction (e.g., pressing a button on a user interface). As the current form instance is filled in, with the user either accepting or rejecting the predicted values, new proposed values can be generated for the remaining form field objects. Moreover, these newly generated proposed values can be displayed in the current form dynamically, such that all field objects can show a predicted value, and these predicted values can change while the user enters data in the field objects.

Visual feedback can be provided in the user interface to distinguish user-entered values from predicted values (e.g., the predicted values can be displayed using a different color). The user can skip ahead in the form, and the previous fields can still show dynamically changing predicted values as the user enters additional values further down in the form instance. With predicted values always present in the form instance, the form instance can be ready for submission at any time by the user. Thus, the user may only need to select and type information into a small subset of the form field objects (e.g., two entered values may be sufficient to complete a form with many fields). Thus, the auto-fill engine can minimize the number of fields the user has to deal with, including by simply tabbing through the field, in order to complete a form.

The predicted values for a form instance are based on values entered in the form field objects in the current form instance, as well as values used in past sessions of the current form and/or other forms. The auto-fill engine 310 can be made to adapt to the user and can use heuristics that are themselves adjusted over time to improve field value prediction. For example, the auto-fill engine 310 can use multiple heuristics to generate likelihood assessments in a modular fashion, such that additional and/or alternative heuristics can be easily plugged into the auto-fill engine 310. Moreover, an optimizer component can be employed to evaluate the effectiveness of each heuristic and allow easy determination of whether adding to and/or modifying the heuristics would improve predictions.

The auto-fill engine 310 can be deployed per user account, for all users of a machine, or at a central server used by an entire organization. Although in practice, the engine should be deployed such that it works closer to the individual to improve its effectiveness. Moreover, due to database size constraints, the auto-fill engine 310 may use a data removal mechanism to remove entered values that are used less often, merge and/or delete entries, and delete fields until the database takes up a specified percentage (e.g., 70%) of a defined memory limit, which may be configurable.

The auto-fill engine 310 can be incorporated into another application used for displaying forms, such as the ACROBAT® software provided by Adobe Systems Incorporated. The engine can be optimized to minimize code size, such as by using STL (Standard Template Library) container reuse and/or compression. The engine can employ macro flags to select the most desirable configuration. Moreover, the engine can allow for two methods of saving the database to a storage document: (1) an incremental mode in which new field name-value pairs can be appended to the storage document, and at startup time, the database can be constructed from the unsorted field name-value pairs; and (2) a rewrite mode in which the entire storage document is rewritten. Additionally, a portion of the storage document can be saved in rewrite mode, followed by segments saved in incremental mode.

The form 300 can have multiple pages that are not all available at once, such as when a multi-page form is downloaded from the Web one page at a time, and the next page is not downloaded until the current page is processed. The auto-fill engine 310 does not require the entire form to be available. Fields can be dynamically added to the form between field value predictions.

Figure 4:
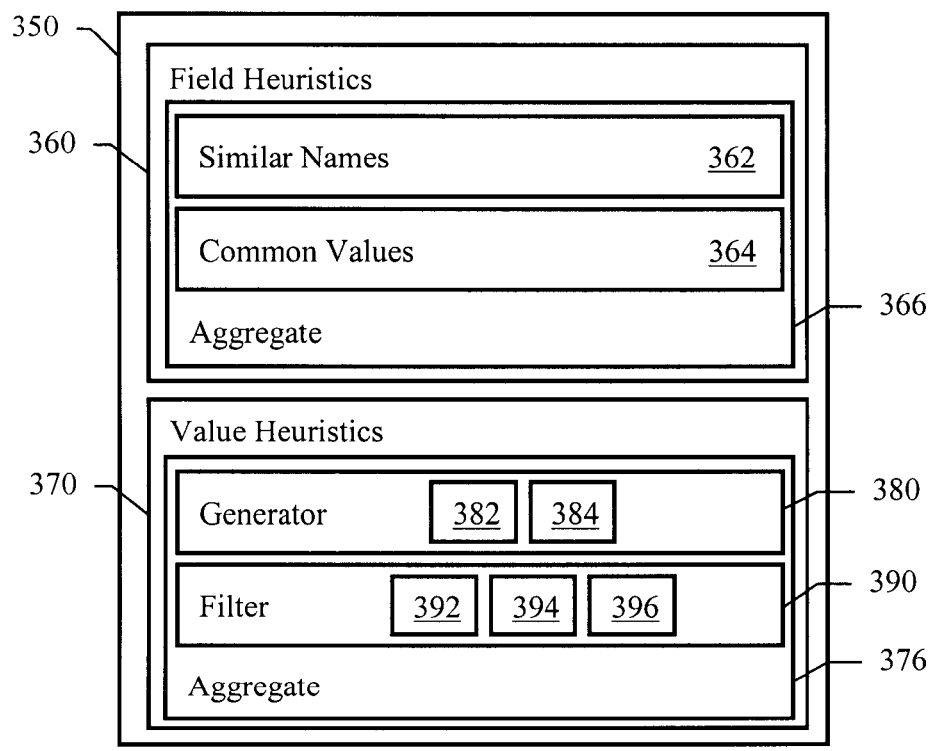
FIG. 4 illustrates a categorization structure for example heuristics that can be used by a forms auto-fill engine implementing form field object value prediction.

FIG. 4 illustrates a categorization structure for example heuristics 350 that can be used by a forms auto-fill engine implementing form field object value prediction. The heuristics 350 can be used to generate the likelihood assessments.

Each heuristic can have an associated weight, and a likelihood assessment for a possible value can be based on the weighted average of the determinations of all the heuristics. The autofill engine can improve field value prediction over time by adjusting the weights and/or other parameters of the heuristics based on how well they have done in the past. This adjustment mechanism can be similar to back-propagation of neural networks, if each heuristic is considered as a neuron and the past field name-value pairs are considered the training set.

The heuristics 350 can include field heuristics 360 and value heuristics 370. The field heuristics 360 determine semantic similarity between fields and thus implicitly cluster fields. Each field heuristic defines a similarity $S_{f1,f2}$, $0 \leq S_{f1,f2} \leq 1$, between two given fields f1 and f2, as well as a confidence $C_{f1,f2}$, $0 \leq C_{f1,f2} \leq 1$. The confidence parameter indicates how certain the heuristic is in determining the similarity. The confidence can also be factored in (e.g., pre-multiplied into) the similarity measure. Pre-multiplication can be performed for convenience and for simplification of the formulas, but confidence is also provided as a separate output parameter since it indicates how much the similarity should be taken into account. For example, a heuristic may determine that two fields are very similar, but may base this determination on insufficient data and therefore may assign low confidence in its result. When confidence is pre-multiplied into the similarity, this will also result in low similarity.

Field heuristics not only compute similarity between fields, but can also recommend specific fields that are similar to a given field. Given a field $F_i$, a field heuristic can return a list of zero or more fields similar to the field $F_i$ and their similarity and confidence as a (0.1] number. Field similarity can be used by some value heuristics to determine value predictions.

The field heuristics 360 can include a similar names heuristic 362, a common values heuristic 364, and an aggregate heuristic 366. The similar names heuristic 362 uses the tag names of fields to determine their similarity. Although a tag name can be any arbitrary string, very often form designers pick names somewhat related to the meaning of the fields. The similar names heuristic 362 assumes that fields with similar names are similar; the name being the internal name of the field (e.g., "name.last") and not the associated text that the user sees (e.g., "Please enter your last name here:"). Although, the similar names heuristic 362 may also take the associated text into account as well, such as by looking for keywords like "name" or "address" in the associated text.

The similar names heuristic 362 can be defined as follows. A category is a list of string names that are semantically very similar or equivalent, such as: (city, town), (firstname, namefirst, namegiven), or (lastname, namelast, namefamily, familyname). The heuristic 362 can be provided with a hard-coded list of categories. Let $NAME_{c,i}$ be the i-th string element of the c-th hard-coded category. Let $NAME_f$ be the string tag name of field f. Let STR_SIM(S1,S2) be a similarity measurement between strings s1 and s2, $0 \leq STR\_SIM(S1,S2) \leq 1$. Let STR_CONF(S1,S2) be a confidence measurement of $STR\_SIM_{s1,s2}$, $0 \leq STR\_CONF(S1,S2) \leq 1$. Then, STR_SIM(S1,S2) and STR_CONF(s1,s2) can be defined as follows:

If s1=s2 then
   STR_CONF(S1,S2) = 1
   STR_SIM(S1,S2)= 1 * STR_CONF(S1,S2) = 1

-continued

Otherwise:
   s1 and s2 are normalized; normalization turns all letters in small
     caps and removes numbers, space, underscore and other
     common separators.
   Let $N_1$ and $N_2$ be the lengths of s1 and s2 after normalization.
   Let NI be the size of the largest common consecutive substring
     of the normalized strings
   If $N_1$<B or $N_2$<B or NI<B (i.e., strings are too small to be reliable)
   then
     STR_CONF(S1,S2) = 0
     STR_SIM(S1,S2) = 0 * STR_CONF(S1,S2) = 0
Otherwise:
   Let NT = $N_1$ + $N_2$
   STR_CONF(S1,S2) = NT / (NT + A)
     (i.e., confidence 0..1 is proportional to NT)
   STR_SIM(S1,S2) = 2 * NI / NT * STR_CONF(S1,S2) =
   2 * NI / (NT + A)

Where A represents the rate of change of confidence with respect to string size (e.g., A>0, with a default of 1), and where B represents the minimum number of characters a string should have to be considered reliable (e.g., B>0, with a default of 3). As indicated above, for sufficiently similar strings, similarity can be proportional to the size of the overlap. Confidence can be proportional to the total number of characters, since fewer characters suggests an increased chance that the overlap is accidental.

The direct similarity/confidence between two fields $S\_FF_{f1,f2}$ can be defined as the direct similarity/confidence between their names:

$C\_FF_{f1,f2}=STR\_CONF(NAME_{f1},NAME_{f2})$ $S\_FF_{f1,f2}=STR\_SIM(NAME_{f1},NAME_{f2})$

For example, if A=1, B=3 and f1's name is "home_phone" the following similar fields f2 and similarity/confidence pairs may be generated: home_phone (1,1), homephone (0.95,0.95), office_phone (0.47,0.95), phone (0.67,0.93), telephone (0.53,0.95), home_address (0.38,0.95).

The similarity/confidence between a field and a category can be defined as the similarity to the best match within the category:

$C\_CF_{c,f}=STR\_CONF(NAME_f,NAME_{c,i})$ where i maximizes $STR\_SIM(NAME_f, NAME_{c,i})$.

$S\_CF_{c,f}=STR\_SIM(NAME_f,NAME_{c,i})$ where i maximizes $STR\_SIM(NAME_f, NAME_{c,i})$.

The category of a given field, CATEGORY(f), is defined as the most similar category:

CATEGORY(f)=c, where c maximizes $S\_CF_{c,f}$

The category similarity and confidence between two fields, $S\_FCF_{f1,f2}$ and $C\_FCF_{f1,f2}$ is the similarity of one of the fields to a common category times the similarity of the second field to the common category, defined as:

If CATEGORY(f1)=CATEGORY(f2) then:
   $S\_FCF_{f1,f2}=S\_CF_{CATEGORY(f1),f1} * S\_CF_{CATEGORY(f1),f2}$
   $C\_FCF_{f1,f2}=C\_CF_{CATEGORY(f1),f1} * C\_CF_{CATEGORY(f1),f2}$
Otherwise:
   $S\_FCF_{f1,f2}=0$
   $C\_FCF_{f1,f2}=0$ For example, let f1 and f2 have the names "Home_town" and "City1" respectively. CATEGORY(f1)=CATEGORY(f2)= (city, town). $S\_CF_{(city,town),f1}=0.61$ (the similarity between "Home_town" and "town") and $S\_CF_{(city,town),f2}=0.8$ (the similarity between "City1" and "city"). Therefore the similarity between "Home_town" and "City1" is $S\_FCF_{f1,f2}= 0.61*0.8=0.49$.

The similarity and confidence between fields f1 and f2 is defined as the maximum of the direct and the category similarity and confidence:

$$S_{f1,f2} = MAX(S\_FF_{f1,f2}, S\_FCF_{f1,f2})$$

$$C_{f1,f2} = MAX(C\_FF_{f1,f2}, C\_FCF_{f1,f2})$$

In practice, the category, if any, for the given field f can be determined first. Then the name of every field is compared to the name of every element in the category, as well as to the normalized name of f to determine the list of fields similar to f. The hard coded category names can be stored in normalized form.

The common values heuristic 364 is based on the observation that semantically similar fields often receive the same values. For example, two fields in which the value "Cupertino" has been used likely have the same or similar semantics—a city. The common values heuristic 364 can be defined as follows. Let $N_f$ be the number of times a value is ever used in a field f. (Multiple uses of the same value are counted separately.) Let $NI_{f1,f2}$ be the number of times the same value is used in both fields f1 and f2. Let $NT_{f1,f2}$ be the total number of times a value is used in f1 or f2:

$$N_{f1,f2} = N_{f1} + N_{f2}.$$

$NI_{f1,f2}$ also includes repeated uses of the same value. For example, if the same value is used 5 times in f1 and 3 times in f2 then it is used min(5,3)=3 times in both f1 and f2.

The confidence is proportional to the total number of values used in either field—i.e. more values used means more data, and thus a higher chance that the determination of this heuristic is not by accident:

$$C_{f1,f2} = NT_{f1,f2}/(NT_{f1,f2} + A)$$

Where A represents the rate of change of confidence with respect to number of values (e.g., A>0, with a default of 1).

The similarity is proportional to the ratio of the number of values used in both fields over the total number of values used in any of the fields:

$$S_{f1,f2} = 2*NI_{f1,f2}/NT_{f1,f2} * C_{f1,f2}$$

For example, a field f1 with name "q12" has been used with values "Providence", "San Jose", "San Jose" and "Atlanta". Another field, f2 with name "home_town" has been used with values "San Jose", "San Jose", "New York", "Providence", "Palo Alto". $N_{f1}=4$; $N_{f2}=5$; $NI_{f1,f2}=3$; $NT_{f1,f2}=4+5=9$; $C_{f1,f2}=9/10=0.9$; $S_{f1,f2}=2*3/9*9/10=0.6$. Thus according to this heuristic the similarity of "f1" and "home_town" is 0.6, with a confidence of 0.9

As can be seen, the common values heuristic 364 is similar to the string similarity measurement of the similar names heuristic 362 (STR_CONF and STR_SIM). The formulas are very similar, except that the similarity measure is based on values in a field instead of characters in a name. Additionally, the common values heuristic 364 can limit the scope of examined fields to only fields which have been used with a value also used in the current field f.

The aggregate heuristic 366 is used to combine the weighted recommendations of multiple field heuristics and can be defined as follows. The aggregate heuristic 366 contains a list of N field heuristics, each with its own weight, $W_n$, where:

$$W_n >= 0, \Sigma W_n = 1.$$

For a given field f, each heuristic determines similarity and confidence, $S_{f,fi}(n)$ and $C_{f,fi}(n)$ to any other field fi. The similarity and confidence of the aggregate field heuristic between fields f and fi is:

IF f=fi Then
$C_{f,fi}=1$
$S_{f,fi}=1$
Otherwise:
$C_{f,fi} = \Sigma_{for\ each\ n} C_{f,fi}(n) * W_n$
$SN_{f,fi} = \Sigma_{for\ each\ n} S_{f,fi}(n) * W_n$
$ST_f = max(1, \Sigma_{for\ each\ field\ fj} SN_{f,fj})$
$S_{f,fi} = SN_{f,fi}/ST_f$ The confidence is the weighted average of the confidence from each of the heuristics it contains. The similarity is the weighted average of the similarity from each of the heuristics.

If the sum of similarities of all fields to a given field f exceeds 1, they are normalized. In other words $\Sigma_{for\ each\ field\ fj} S_{f,fj} <= 1$. Therefore, unlike similarity produced by the other field heuristics, this similarity is not always associative. Normalization is done here instead of in each other field heuristic to allow for a heuristic to recommend multiple fields that are very similar to f, without having to decrease their similarity.

The value heuristics 370 determine the likelihood $L_{v,f,s}$ that a value v will be picked as the default by the user for field f during a current fill-in session s, as well as a confidence $C_{v,f,s}$ of the likelihood. The confidence can be pre-multiplied into the likelihood. Each likelihood is independent on the others and is in the scope $0 < L_{v,f,s} < 1$. Thus, the sum of the likelihood assessments of all defaults for a given field f can be less than or more than 1.

The value heuristics 370 can include one or more generator heuristics 380 and zero or more filter heuristics 390. Both types can determine the likelihood and confidence of using a given value in a given field. Additionally, generators can also recommend specific values. A generator heuristic can recommend, for example, all values that have ever been used in a given field in the past. A filter heuristic can recommend, for example, numeric types of values for a given field but is generally unsuitable for recommending specific values.

In practice, the likelihood/confidence are not computed separately for each of all possible values. Instead, each generator heuristic determines a list of possible values with nonzero likelihood assessments of being defaults for the given field f and the lists are then processed. This can be more efficient because each heuristic has a way of using the data structures to avoid looking at every possible value.

The generator heuristics 380 can include a shared value generator heuristic 382. This heuristic is based on the observation that a value that has been used in the past in the given field f is a possible future value for that field, based on how frequently it has been used in f in the past. In general, a value that is used in a semantically similar field fi to the given field f is a good default for f, based on how frequently it has been used in fi and how similar fi and f are (a field is 100% similar to itself). The shared value generator heuristic can be defined as follows. Let $N_{f,v}$ be the number of times value v has been used in the given field f. Let $N_f$ be the number of all values ever used in the given field:

$$N_f = \Sigma_{for\ each\ value\ v} N_{f,v}$$

$C_f$ represents the confidence of using the values of field f for this heuristic. The confidence is proportional to the number of values used in f:

$$C_f = N_f/(N_f + A)$$

Where A represents the rate of change of confidence with respect to the number of values (e.g., A>0, with a default of 1).

$L_{f,v}$ is the ratio of the use of value v in field f over all values used in f, weighted by the confidence:

$$L_{f,v} = (N_{f,v}/N_f) * C_f$$

Let $S_{f1,f2}$ be the similarity between two fields as computed by the aggregate field heuristic (the confidence being factored into the similarity). The confidence and likelihood of using value v in field f in session s is defined by:

$$C_{v,f,s} = \Sigma_{for\ each\ field\ fi}(C_{fi} * S_{f,fi})$$

$$L_{v,f,s} = \Sigma_{for\ each\ field\ fi}(L_{fi,v} * S_{f,fi})$$

Therefore, the confidence is the same for all values, and both the confidence and the likelihood do not depend on other entries of the current session (i.e., on s). The scope of examined values can be limited to every value ever used in one of the fields in the list of fields similar to f.

The generator heuristics 380 can also include a history value generator heuristic 384. This heuristic is based on the observation that values often come in ordered clusters. For example, the street address is often followed by the city name, the state and the zip code. Similarly, last name is often followed (or preceded) by first name. Thus, if the user has used frequently "San Jose" followed by "CA" followed by "95110" in the past, and if the previous two values are "San Jose" and "CA", the heuristic would predict "95110" even if it knows nothing about the current field (i.e., if a totally new form with new field names is used). The history value generator heuristic can be defined as follows.

The Tab Order History List ("TOHL") of a given entry e ($T_e$) is the ordered list of all values used in that and previous entries to the beginning of the form, where entries are ordered by their fields' tab order. There can be a TOHL corresponding to every entry used in any session in the past. For example, suppose that in session s the first 6 fields in a form, in tab order, have the following entries: e1="Smith", e2="Joe", e3="13 Brown Street", e4="Providence", e5="RI", e6="02912". Then $T_{e4}$ is ("Providence", "13 Brown Street", "Joe", "Smith") and $T_{e1}$ is ("Smith").

Let $T_{f,v,s}$ be the TOHL for the entry corresponding to field object f in session s, if it were to have value v. (In the current session the field f may not yet have a value entered in it, so this mechanism is used to represent hypothetical tab order history lists). The degree of match, $NI_{t1,t2}$, between TOHL-s t1 and t2 is the number of consecutive common elements starting from the first element. For example, let TOHL t1 be ("Providence", "13 Brown Street", "Joe", "Smith"), TOHL t2 be ("Providence", "13 Brown Street", "Jenny") and TOHL t3 be ("New York", "13 Brown Street", "Joe", "Smith"). Then $NI_{t1,t2}$=2, while $NI_{t1,t3}$=0 because the first elements do not match, even if the rest do.

Let $N_t$ ($N_t$>0) be the number of times TOHL t has been used, which equals the number of times the entry corresponding to its first element has been used. The same entry is used when the same value is used in the same field with the same previous entry. If an entry is used N times, this means that its previous entries have been used at least N times, and therefore its TOHL is used N times. Note that in FIG. 2 all entries preceding a given entry have the same or larger count. The count for the entry in which "Palo Alto" is used is 2, and all preceding entries have a count of at least 2.

Let $NT_{t1,t2}$=$N_{t1}$+$N_{t2}$. Let TS(t1,t2) define the similarity between TOHLs t1 and t2. It is proportional to their degree of match and to the number of times they have been used, or 0 if the degree of match is less than two elements:

If $NI_{t1,t2}$>1 Then
 TS(t1,t2)=$NT_{t1,t2}$/($NT_{t1,t2}$+A)*$NI_{t1,t2}$/($NI_{t1,t2}$+B)
Otherwise:
 TS(t1,t2)=0

Where A represents the rate of change of confidence with respect to the number of occurrences of TOHLs (e.g., A>0, with a default of 1), and where B represents the rate of change of confidence with respect to similarity between TOHLs (e.g., B>0, with a default of 1). For $NI_{t1,t2}$ to be 1 would mean that only the first element of t1 and t2 is the same. This need not be considered sufficient similarity; this heuristic can require at least two consecutive values to match, so in this case we set TS(t1,t2)=0.

The likelihood $L_{f,v,s}$ for this heuristic is the maximum similarity between $T_{f,v,s}$ and any other TOHL:

$$C_{f,v,s} = 1$$

$$L_{f,v,s} = TS(T_{f,v,s}, T_e) * C_{f,v,s} \text{ where } e \text{ maximizes } TS(T_{f,v,s}, T_e)$$

The scope of examined values can be limited to all values ever used immediately after the value currently used in the previous entry. For example in the data structure on FIG. 2 one can get to the previous entry of the current entry, then to its list of next entries. Only values in those next entries need to be considered by this heuristic.

The filter heuristics 390 can include a value type filter heuristic 392. This filter is based on the observation that values used in the same field generally share the same type—i.e. they are either all numeric, text, or mixed numeric and text. For example, fields such as LastName, and City generally have text values, fields such as Address generally have mixed values, and fields such as TelephoneNumber or SSN generally have numeric values. Other value type determinations are also possible, such as currency, percentage, date, etc.

The value type filter heuristic can be defined as follows. Each value v has a type m, which must be in one of these three types:

Numeric: if v has at least one digit and all other characters are in the set of {digit,dash,comma,space,brackets}
Text: if v has at least one letter and all other characters are in the set of {letter,dash,comma,full-stop,space,apostrophe}
Mixed: if v is neither numeric nor text.

Let $T_{v,m}$ be 1 if v is of type m and 0 otherwise.

Each field f has a likelihood $TL_{f,m}$ and confidence $TC_{f,m}$ of being in one of the three types, where m is one of {Numeric, Text, Mixed} computed as the average of the types of values used in f and similar fields, weighted by the field similarity. $TL_{f,m}$ and $TC_{f,m}$ are computed as follows:

Let $N_{f,v}$ be the number of times value v has been used in the given field f.
Let $N_{f,m}$ be the number of times values of type m have been used in field f:
 $N_{f,m} = \Sigma_{for\ each\ value\ v} N_{f,v} * T_{v,m}$
Let $N_f$ be the number of all values ever used in the given field f.
 $N_f = \Sigma_{for\ each\ value\ v} N_{f,v} = \Sigma_{for\ each\ type\ m} N_{f,m}$
$C_f$ represents the confidence of using the values of field f for this heuristic. The confidence is proportional to the number of values used in f:

$$C_f = N_f / (N_f + A)$$

Where A represents the rate of change of confidence with respect to the number of values (e.g., A>0, with a default of 1).

$L_{f,m}$ is the ratio of the use of values of type $T_m$ in field f over all values used in f, weighted by the confidence:

$$L_{f,m} = (N_{f,m}/N_f) * C_f$$

Let $S_{f,fi}$ be the similarity between two fields as computed by the aggregate field heuristic (the confidence being factored into the similarity). The confidence and likelihood of field f to be of type m is defined as:

$$TC_f = \Sigma_{\text{for each field } fi}(C_{fi} * S_{f,fi})$$

$$TL_{f,m} = \Sigma_{\text{for each field } ti}(L_{fi,m} * S_{f,fi})$$

When comparing these formulas with the ones for the shared value heuristic, one notable difference is that the shared value heuristic considers the use of each value, whereas the value type heuristic considers the use of each value type. Additionally, the sum of all type likelihood assessments for a field equals the confidence:

$$TC_f = \Sigma_{\text{for each type } m} TL_{f,m}$$

This is because the likelihood assessments are based on past data. Less available data on which to base the result translates into lower confidence in the result and a lower likelihood that the field is of any particular type.

The value type heuristic defines the likelihood of a given value v being the possible value for a given field f to equal the likelihood of the field being of the type of the value. The confidence equals the confidence of the field being of any type:

$$C_{f,v,s} = TC_f$$

$$L_{f,v,s} = \Sigma_{\text{for each type } m} TL_{f,m} * T_{v,m}$$

The filter heuristics 390 can also include a field predictability heuristic 394. This filter is based on the observation that the defaults of some fields, such as "lastname" are more predictable, while others, such as "misc.expenses" are different every time, thus not predictable. The field predictability heuristic suppresses the likelihood of all proposed values of fields that are deemed unpredictable. In some implementations, the user interface for the auto-fill engine only proposes possible values to the user if their likelihood is above a given threshold. As a result of this heuristic, the user won't have to be bothered by proposed defaults for unpredictable fields. The field predictability heuristic can be defined as follows.

Field predictability depends on the type of the field (numeric fields are generally less predictable) as well as on the specifics of the field. Let $H_f$ be the number of times the heuristics have ever been applied to predict the value of field f with verifiable results and $HS_f$ be the number of times the prediction has turned out to be correct. The field-specific predictability $FSP_f$ is proportional to the ratio of past successful predictions over all predictions, and the confidence of the result $FSC_f$ is proportional to the number of past predictions:

$$FSC_f = H_f/(H_f + A)$$

$$FSP_f = HS_f/H_f * FSC_f$$

Let $TSP_m$ be the average predictability of fields of a given type m (where $TL_{f,m}$ is the likelihood of field f being of type m, as defined in the Value Type Filter Heuristic).

$$TSP_m = (\Sigma_{\text{for each field } f} FSP_f * TL_{f,m}) / \Sigma_{\text{for each field } f} TL_{f,m}$$

Let $FTP_f$ be the predictability of the field due to its type distribution:

$$FTP_f = \Sigma_{\text{for each type } m} TSP_m * TL_{f,m}$$

The final predictability is the weighted average of the one based on the field-specific past data and on type-specific past data:

$$FP_f = FSP_f * B + FTP_f * (1-B)$$

Where A represents the rate of change of confidence with respect to the number of past predictions (e.g., A>0, with a default of 1), and where B represents the weight of the field specific versus type specific data (e.g., 0<B<1, with a default: 0.7).

The likelihood and confidence specified by this heuristic are:

$$C_{v,f,s} = 1 - FP_f$$

$$L_{v,f,s} = 0$$

This heuristic suppresses each proposed default value v equally. The confidence (i.e., strength) of the suppression is inversely proportional to the field predictability.

Using number of past predictions $H_f$ and successful predictions $HS_f$ involves keeping those two numbers per field persistently (i.e., they are saved in the data store with the field). Alternatively, an easier measure of predictability of the field can be used: the ratio of the unique values ever used in that field. If $N_f$ and $NU_f$ are the number of total and unique number of values used in field f:

$$FSC_f = N_f/(N_f + A)$$

$$FSP_f = (1 - NU_f/N_f) * FSC_f$$

Usually fields that have a large proportion of unique values used in them are unpredictable, but that is not always the case. For example, an "enter number from line 39" field may be used every time with a unique value and may still be very predictable. Also, $TSP_m$ are only three numbers (m can be text, numeric or mixed) and are unlikely to be very dependent on the context of use, and they are too expensive to compute every time. Thus, reasonable hard-coded values may be used instead.

The filter heuristics 390 can also include a common session filter heuristic 396. This heuristic is based on the observation that values tend to be used in groups, each group being specific to the "topic" of the form being filled. For example, if a given name and address have been used in the same session many times (on the same or different forms), that name and address get associated, so that if the name is used in the current session, the corresponding address should be given higher preference over other addresses.

The history value generator heuristic achieves a similar goal but on a different scale. On the one hand, it is more constrained as it's context is the specific tab order of entries, but on the other hand it can have different contexts at different parts of the form within the same session. For example, the history heuristic might be able to complete two different addresses (city/state/zip) on the same form (that have been used before, but never in the same session) based on, for example, the street name and number. In another example, a form is filled for each person working in the company. While each name is unique, the company address stays the same and the value history heuristic would determine it while the common sessions filter would not.

The common session heuristic, on the other hand, can be useful when the values are used in different order in different forms, or have other values in between the sequence. For example, in one previously used form the values could be: "Smith", "Joe", "New York". In another the values could be: "Joe", "Smith", "543", "New York", "NY". The first and last names are in reverse order, and there is another value "543" inserted into the sequence, which confuses the history value heuristic, but the common session heuristic still successfully associates "Joe", "Smith" and "New York", so that if some of those values appear in current form, the rest are more likely candidates for the unfilled fields.

Each session has a unique ID, s, (e.g., the corresponding element of the sequence of natural numbers). Let $U_{v,s}$ be 1 if value v was used in session s and 0 otherwise. Let $N_s$ be the number of values used in session s:

$$N_s = \Sigma_{\text{for all values } v} U_{v,s}$$

Let $NI_{s1,s2}$ be the number of the same values used in both sessions s1 and s2:

$$NI_{s1,s2} = \Sigma_{\text{for all values } v} U_{v,s1} * U_{v,s2}$$

$NI_{s1,s2}$ is a measurement of similarity between two sessions. The more the values is used in both sessions, the more similar they are.

Let $NB_{v,s}$ be the number of values used in both session s and any other session in which v is used:

$$NB_{v,s} = \Sigma_{\text{for all sessions } si} U_{v,si} * NI_{s,si}$$

$NB_{v,s}$ is a measurement of how much value v "belongs" to session s. The more the value is used in sessions similar to s, and the more similar to s they are, the higher $NB_{v,s}$.

The confidence and likelihood of value v being used in field f of session s as defined by this heuristic is:

$$C_{v,f,s} = N_s / (N_s + A)$$

$$L_{v,f,s} = NB_{v,s} / (NB_{v,s} + B) * C_{v,f,s}$$

Where A represents the rate of change of confidence with respect to the number of values used in a session (e.g., A>0, with a default of 1), and where B represents the rate of change of likelihood with respect to how much a value belongs to the given session (e.g., B>0, with a default of 1). The confidence is proportional to the number of values already used in the current form—the fewer the number of values, the less reliable the data. The confidence should also be dependent on the number of values used in other sessions, but it can be difficult to compute this efficiently in terms of time and memory. The likelihood is proportional to the number of values used in the current form that have been used together with v in any other form.

In practice, it may be too expensive to keep a persistent list of every session every value has been used in. Thus, as an alternative, every value can have a constant-size (e.g., 32-bit) mask. If the value is used in session s, then a corresponding bit number (s mod the constant-size) is set. Over time, more bits of the mask of each value will be set but this should not excessively decrease the effectiveness of the heuristic. Using such a fixed-size "hash" of all sessions can improve the performance of the algorithms, and larger masks can be used as necessary.

The value heuristics 370 can also include an aggregate value heuristic 376, which is analogous to the aggregate field heuristic 366. The aggregate value heuristic 376 is used to combine the weighted recommendations of multiple value heuristics and can be defined as follows.

This heuristic contains a list of N value heuristics, (at least one of which is a generator), each with its own weight, Wn, where: Wn>=0, $\Sigma Wn = 1$. For a given value v, field f and session s, each heuristic determines likelihood and confidence, Lf,v,s(n) and Cf,v,s(n). The likelihood and confidence of the aggregate field heuristic is:

$$C_{f,v,s} = \Sigma \text{ for each } n \; C_{f,v,s}(n) * W_n$$

$$L_{f,v,s} = \Sigma \text{ for each } n \; S_{f,v,s}(n) * W_n$$

The generator heuristics are invoked first. Each generator heuristic returns a list of proposed values. The filter heuristics can then be applied to modify the likelihood assessments of each value determined by the generator heuristics, and then all proposed values are merged into a common list using the aggregate heuristic 376.

As mentioned previously, the auto-fill engine can implement a self-improvement mechanism. The predictions can improve over time not only because the size of the database increases, but also because the manner in which that data is used is improved. By comparing the predictions of the heuristics to the actual values the user has chosen, the engine can evaluate which heuristics do better, and in which circumstances, and increase their relative weights, as well as optimize some of the other heuristic-specific parameters referenced above. As a result, the engine can adapt to customer-specific use.

There are three general possibilities regarding calibration of the heuristics: (1) on-the-fly calibration, (2) periodic calibration, and (3) no calibration. With on-the-fly calibration, every time the user enters a value in a field, the engine first asks the heuristics what value they would predict, compares the results to the real value and rewards the ones that predict the correct value and decreases the weight of others that are consistently wrong. The benefit of this approach is that it is fast, transparent to the user and effective immediately. One possible disadvantage is that it may result in unknown rate of change, and thus, possibly result in over-training or under-training the heuristics.

Periodic calibration involves training the parameters of the heuristics over all past data and picking the set of parameters that would maximize the number of successful predictions, such as by using methods of multi-dimensional function minimization. The benefit of this approach is that self-calibration should be quantifiably effective. However, the process can take a noticeable amount of time and should be performed at carefully selected times, such as after filling N forms, or during idle time. This type of periodic calibration should use a large representative set of filled forms.

In the no calibration approach, the heuristics are first calibrated on a large set of representative forms and then the parameters are hard-coded. To be effective though, these hard-coded parameters should be good enough to apply to any general situation.

Additionally, the calibration technique employed may be a variable technique and/or configurable by a user. For example, the auto-fill engine can be trained on an initial large set of representative forms before delivery to a user, then the engine can have an initial training period with a particular user, after which the user is allowed to halt, and later restart, active training.

The invention can be implemented in digital electronic circuitry, or in computer hardware, firmware, software, or in combinations of them. Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD (liquid crystal display) screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the operations of the invention can be performed in a different order and still achieve desirable results. The various formulas may be different. The parameters, such as those denoted A and B as well as the weights $W_i$ for each field and value heuristic, can have different defaults, or they can depend on additional factors. For example, a first heuristic may be given higher weight only when applied to numeric fields, and/or a second heuristic could be given less weight when applied to the first field in a form. A subset of the heuristics may be used, and additional heuristics may be used. In some implementations, new heuristics may be defined externally, dynamically added, and/or available on certain forms only. For example, a car insurance company may have a database of car insurance policies available, and may provide an external heuristic that generates likelihood assessments based on the previously used values in the form and on information from the external database. A tool may be provided to allow a user to quickly formulate such externally defined heuristics.

What is claimed is:

1. A method comprising:
   observing values entered in form field objects;
   generating likelihood assessments for possible values to be entered in a current form field object based on the observed values, the likelihood assessments indicating relative probability of the possible values being entered in the current form field object; and
   predicting a value for the current form field object based on the generated likelihood assessments,
   wherein generating likelihood assessments comprises:
      determining a semantic similarity between the current form field object and a form field for which values have been observed; and
      generating a likelihood assessment for a possible value based on the observed values for the form field and the determined semantic similarity.

2. The method of claim 1, wherein determining a semantic similarity comprises comparing the current form field object and the form field with a semantic category.

3. The method of claim 2, wherein determining a semantic similarity further comprises determining a semantic similarity between a name of the current form field object and a name of the form field, the semantic similarity being proportional to a degree of match of the names to the semantic category.

4. The method of claim 1, wherein determining a semantic similarity comprises comparing a name of the current form field object with a name of the form field.

5. The method of claim 4, wherein comparing a name of the current form field object with a name of the form field comprises comparing a previously unobserved name of the current form field object with the name of the form field.

6. The method of claim 1, wherein determining a semantic similarity comprises comparing the observed values with each other.

7. The method of claim 6, wherein the semantic similarity is proportional to a ratio of a first quantity and a second quantity, the first quantity being a number of values observed in both the form field and a form field to which the current form field object corresponds, and the second quantity being the first quantity plus a number of values observed in only one of the two form fields.

8. The method of claim 1, wherein generating a likelihood assessment for a possible value comprises generating a likelihood assessment that is proportional to the semantic similarity and to a frequency of use of the possible value in the form field; and wherein determining a semantic similarity comprises:
   comparing the current form field object and the form field with a semantic category, and
   comparing the observed values with each other.

9. The method of claim 1, wherein observing values entered in form field objects comprises storing order information for the observed values, and wherein generating likelihood assessments for possible values comprises comparing order information for values entered in a current form instance with the stored order information for the observed values.

10. The method of claim 9, wherein storing order information for the observed values comprises retaining form tab order information for the observed values.

11. The method of claim 9, wherein generating likelihood assessments for possible values further comprises generating a likelihood assessment for a possible value, the likelihood assessment being proportional to a degree of match between a first ordered set and a second ordered set, the first ordered set corresponding to a portion of the stored order information for the possible value, and the second ordered set corresponding to the possible value plus values entered in the current form instance before the current form field object; and the method further comprising, before predicting a value for the current form field object:
   adjusting the generated likelihood assessments based on a determined characteristic of the current form field object, and
   adjusting the generated likelihood assessments based on a determined characteristic of the possible values.

12. The method of claim 1, further comprising, before predicting a value for the current form field object, adjusting the generated likelihood assessments based on a determined characteristic of the current form field object.

13. The method of claim 12, wherein the determined characteristic of the current form field object comprises a determined type for previously entered values.

14. The method of claim 12, wherein the determined characteristic of the current form field object comprises a field type distribution indicating probabilities that the current form field object is of a given type.

15. The method of claim 14, wherein the field type distribution for the current form field object is based on a determination of semantic similarity between the current form field object and a form field for which values have been observed.

16. The method of claim 12, wherein the determined characteristic of the current form field object comprises a determined field predictability of a form field to which the current form field object corresponds.

17. The method of claim 16, wherein the determined field predictability is determined based on a degree of past successful value prediction for the form field.

18. The method of claim 16, wherein the determined field predictability is determined based on a ratio of a number of past values entered in the form field and a number of past unique values entered in the form field.

19. The method of claim 1, further comprising, before predicting a value for the current form field object, adjusting the generated likelihood assessments based on a determined characteristic of the possible values.

20. The method of claim 19, wherein the determined characteristic of the possible values comprises frequency of common session use for the possible values in relation to values already entered in a current form instance.

21. The method of claim 1, wherein predicting a value for the current form field object comprises:
receiving user input activating the current form field object and entering one or more characters; and
in response to the user input, displaying a selected value in the current form field object, the selected value being a value from the possible values with a highest likelihood assessment that also matches the one or more characters.

22. The method of claim 1, wherein predicting a value for the current form field object comprises:
receiving user input activating the current form field object; and
in response to the user input, displaying a selected value in the current form field object, the selected value being a value from the possible values with a highest likelihood assessment.

23. The method of claim 22, wherein predicting a value further comprises checking that the highest likelihood assessment is greater than a threshold before displaying the selected value.

24. The method of claim 1, wherein predicting a value for the current form field object comprises displaying a list of the possible values ordered by the likelihood assessments.

25. The method of claim 24, wherein displaying a list of the possible values comprises displaying a list of a subset of the possible values, the subset being based on a likelihood threshold and a list size limit.

26. The method of claim 1, wherein generating likelihood assessments comprises generating likelihood assessments for possible values to be entered in multiple current form field objects in a current form instance.

27. The method of claim 26, wherein predicting a value comprises predicting multiple values for the multiple current form field objects in the current form instance.

28. The method of claim 27, wherein predicting multiple values comprises:
displaying values selected from the possible values in the multiple current form field objects; and
displaying a new value in place of one of the displayed values in one of the multiple current form field objects in response to user input, the new value being a predicted value based on generated likelihood assessments and the user input.

29. A software product tangibly stored on a machine-readable medium, the software product comprising instructions operable to cause a programmable processor to perform operations comprising:
observing values entered in form field objects;
determining a semantic similarity between a current form field object and a form field for which values have been observed;
generating likelihood assessments for possible values for the current form field object based on the observed values for the form field and the determined semantic similarity, the likelihood assessments indicating relative probability of the possible values being entered in the current form field object; and
providing the generated likelihood assessments and the possible values for use in predicting a value for the current form field object.

30. The software product of claim 29, wherein determining a semantic similarity comprises comparing the current form field object and the form field with a semantic category.

31. The software product of claim 30, wherein determining a semantic similarity further comprises determining a semantic similarity between a name of the current form field object and a name of the form field, the semantic similarity being proportional to a degree of match of the names to the semantic category.

32. The software product of claim 29, wherein determining a semantic similarity comprises comparing a name of the current form field object with a name of the form field.

33. The software product of claim 32, wherein comparing a name of the current form field object with a name of the form field comprises comparing a previously unobserved name of the current form field object with the name of the form field.

34. The software product of claim 29, wherein determining a semantic similarity comprises comparing the observed values with each other.

35. The software product of claim 34, wherein the semantic similarity is proportional to a ratio of a first quantity and a second quantity, the first quantity being a number of values observed in both the form field and a form field to which the current form field object corresponds, and the second quantity being the first quantity plus a number of values observed in only one of the two form fields.

36. The software product of claim 29, wherein generating a likelihood assessment for a possible value comprises generating a likelihood assessment that is proportional to the semantic similarity and to a frequency of use of the possible value in the form field; and wherein determining a semantic similarity comprises:
comparing the current form field object and the form field with a semantic category, and
comparing the observed values with each other.

37. The software product of claim 29, wherein predicting a value for the current form field object comprises:
receiving user input activating the current form field object and entering one or more characters; and
in response to the user input, displaying a selected value in the current form field object, the selected value being a value from the possible values with a highest likelihood assessment that also matches the one or more characters.

38. The software product of claim 29, wherein predicting a value for the current form field object comprises displaying a list of the possible values ordered by the likelihood assessments.

39. The software product of claim 38, wherein displaying a list of the possible values comprises displaying a list of a subset of the possible values, the subset being based on a likelihood threshold and a list size limit.

40. A software product tangibly stored on a machine-readable medium, the software product comprising instructions operable to cause a programmable processor to perform operations comprising:
   storing order information for values observed in form field objects;
   generating likelihood assessments for possible values to be entered in a current form field object based on a comparison of order information for values entered in a current form instance with the stored order information for the observed values, the likelihood assessments indicating relative probability of the possible values being entered in the current form field object; and
   providing the generated likelihood assessments and the possible values for use in predicting a value for the current form field object.

41. The software product of claim 40, wherein storing order information for the observed values comprises retaining form tab order information for the observed values.

42. The software product of claim 40, wherein generating likelihood assessments for possible values further comprises generating a likelihood assessment for a possible value, the likelihood assessment being proportional to a degree of match between a first ordered set and a second ordered set, the first ordered set corresponding to a portion of the stored order information for the possible value, and the second ordered set corresponding to the possible value plus values entered in the current form instance before the current form field object; and the operations further comprising, before predicting a value for the current form field object:
   adjusting the generated likelihood assessments based on a determined characteristic of the current form field object, and
   adjusting the generated likelihood assessments based on a determined characteristic of the possible values.

43. The software product of claim 40, the operations further comprising, before predicting a value for the current form field object, adjusting the generated likelihood assessments based on a determined characteristic of the current form field object.

44. The software product of claim 43, wherein the determined characteristic of the current form field object comprises a determined type for previously entered values.

45. The software product of claim 43, wherein the determined characteristic of the current form field object comprises a field type distribution indicating probabilities that the current form field object is of a given type.

46. The software product of claim 45, wherein the field type distribution for the current form field object is based on a determination of semantic similarity between the current form field object and a form field for which values have been observed.

47. The software product of claim 43, wherein the determined characteristic of the current form field object comprises a determined field predictability of a form field to which the current form field object corresponds.

48. The software product of claim 47, wherein the determined field predictability is determined based on a degree of past successful value prediction for the form field.

49. The software product of claim 47, wherein the determined field predictability is determined based on a ratio of a number of past values entered in the form field and a number of past unique values entered in the form field.

50. The software product of claim 40, the operations further comprising, before predicting a value for the current form field object, adjusting the generated likelihood assessments based on a determined characteristic of the possible values.

51. The software product of claim 50, wherein the determined characteristic of the possible values comprises frequency of common session use for the possible values in relation to values already entered in a current form instance.

52. The software product of claim 40, wherein predicting a value for the current form field object comprises:
   receiving user input activating the current form field object; and
   in response to the user input, displaying a selected value in the current form field object, the selected value being a value from the possible values with a highest likelihood assessment.

53. The software product of claim 52, wherein predicting a value further comprises checking that the highest likelihood assessment is greater than a threshold before displaying the selected value.

54. A system comprising one or more processors:
   an input/output system;
   an auto-fill engine providing proposed values and corresponding likelihood assessments generated based on values entered in observed form fields using the input/output system, the likelihood assessments indicating relative probability of the proposed values being entered in one or more current form field objects in a current form instance; and
   a form presentation component displaying the current form instance using the input/output system such that one or more predicted values are displayed in connection with the one or more current form field objects, the one or more predicted values being selected from the proposed values based on the likelihood assessments,
   wherein the auto-fill engine provides the proposed values and the corresponding likelihood assessments based on a determination of semantic similarity among the one or more current form field objects and the observed form fields.

55. The system of claim 54, wherein the determination of semantic similarity comprises a comparison of the one or more current form field objects and the observed form fields with a semantic category.

56. The system of claim 55, wherein the determination of semantic similarity further comprises a determination of a semantic similarity between a name of the current form field object and a name of the form field, the semantic similarity being proportional to a degree of match of the names to the semantic category.

57. The system of claim 54, wherein the auto-fill engine further provides the proposed values and the corresponding likelihood assessments based on a comparison of tab order information for values entered in the current form instance with tab order information for the values entered in the observed form fields.

58. The system of claim 54, wherein the form presentation component displays a predicted value in one of the one or more current form field objects in response to user activation of the one of the one or more current form field objects when a likelihood assessment for the predicted value is a highest of likelihood assessments corresponding to the one of the one or more current form field objects and the likelihood assessment for the predicted value surpasses a threshold.

59. The system of claim 54, wherein the form presentation component displays a predicted value in one of the one or more current form field objects in response to user activation of and data entry in the one of the one or more current form field objects when a likelihood assessment for the predicted value is a highest of likelihood assessments corresponding to the one of the one or more current form field objects and the predicted value matches the entered data.

60. The system of claim 54, wherein the form presentation component displays a list of the proposed values ordered by likelihood assessments in response to user activation of one of the one or more current form field objects, the list being displayed in proximity to the one of the one or more current form field objects.

61. The system of claim 60, the form presentation component displays a list of a subset of the proposed values, the subset being based on a likelihood threshold and a list size limit.

62. The system of claim 54, wherein the form presentation component displays the one or more predicted values in the one or more current form field objects and dynamically redisplays new one or more predicted values in response to user input to the current form instance.

63. The system of claim 54, wherein the form presentation component comprises a portion of a machine network browser.

64. The system of claim 54, wherein the auto-fill engine generates the likelihood assessments by generating at least two likelihood assessments for each of the proposed values, and aggregating the at least two likelihood assessments for each of the proposed values.

65. The system of claim 54, wherein the auto-fill engine is configured to adjust operating parameters to improve form field value prediction.

66. The system of claim 54, wherein the determination of semantic similarity comprises a comparison of a name of the current form field object with a name of the form field.

67. The system of claim 66, wherein the comparison of a name of the current form field object with a name of the form field comprises a comparison of a previously unobserved name of the current form field object with the name of the form field.

68. The system of claim 54, wherein the determination of semantic similarity comprises a comparison of the observed values with each other.

69. The system of claim 68, wherein the semantic similarity is proportional to a ratio of a first quantity and a second quantity, the first quantity being a number of values observed in both the form field and a form field to which the current form field object corresponds, and the second quantity being the first quantity plus a number of values observed in only one of the two form fields.

70. The system of claim 54, wherein the auto-fill engine generates a likelihood assessment for a proposed value by generating a likelihood assessment that is proportional to the semantic similarity and to a frequency of use of the proposed value in the form field; and wherein the determining of semantic similarity comprises:
   a comparison of the current form field object and the form field with a semantic category, and
   a comparison of the observed values with each other.

71. The system of claim 54, wherein the auto-fill engine further provides the proposed values and the corresponding likelihood assessments based on a comparison of order information for values entered in the current form instance with order information for the values entered in the observed form fields.

72. The system of claim 71, wherein the order information for the values entered in the observed form fields comprises tab order information for the values entered in the observed form fields.

73. The system of claim 71, wherein the auto-fill engine generates the likelihood assessments for proposed values by generating a likelihood assessment for a proposed value, the likelihood assessment being proportional to a degree of match between a first ordered set and a second ordered set, the first ordered set corresponding to a portion of the stored order information for the proposed value, and the second ordered set corresponding to the proposed value plus values entered in the current form instance before the current form field object; and the auto-fill engine, before providing a value for a current form field object, adjusts the generated likelihood assessments based on a determined characteristic of the current form field object, and adjusts the generated likelihood assessments based on a determined characteristic of the possible values.

74. The system of claim 54, wherein the auto-fill engine, before providing a value for a current form field object, adjusts the generated likelihood assessments based on a determined characteristic of the current form field object.

75. The system of claim 74, wherein the determined characteristic of the current form field object comprises a determined type for previously entered values.

76. The system of claim 74, wherein the determined characteristic of the current form field object comprises a field type distribution indicating probabilities that the current form field object is of a given type.

77. The system of claim 76, wherein the field type distribution for the current form field object is based on a determination of semantic similarity between the current form field object and a form field for which values have been observed.

78. The system of claim 74, wherein the determined characteristic of the current form field object comprises a determined field predictability of a form field to which the current form field object corresponds.

79. The system of claim 78, wherein the determined field predictability is determined based on a degree of past successful value prediction for the form field.

80. The system of claim 78, wherein the determined field predictability is determined based on a ratio of a number of past values entered in the form field and a number of past unique values entered in the form field.

81. The system of claim 54, wherein the auto-fill engine, before providing a value for a current form field object, adjusts the generated likelihood assessments based on a determined characteristic of the possible values.

82. The system of claim 81, wherein the determined characteristic of the possible values comprises frequency of common session use for the possible values in relation to values already entered in a current form instance.

83. The system of claim 54, wherein the form presentation component displays a predicted value in one of the one or more current form field objects in response to user activation of the one of the one or more current form field objects when a likelihood assessment for the predicted value is a highest of likelihood assessments corresponding to the one of the one or more current form field objects.

84. A software product tangibly stored on a machine-readable medium, the software product comprising instructions operable to cause a programmable processor to perform operations comprising:
   observing values entered in form field objects;
   generating likelihood assessments for possible values to be entered in a current form field object based on the observed values, the likelihood assessments indicating relative probability of the possible values being entered in the current form field object; and predicting a value for the current form field object based on the generated likelihood assessments;

wherein generating likelihood assessments comprises generating likelihood assessments for possible values to be entered in multiple current form field objects in a current form instance, wherein predicting a value comprises predicting multiple values for the multiple current form field objects in the current form instance, and wherein predicting multiple values comprises:
   displaying values selected from the possible values in the multiple current form field objects; and
   displaying a new value in place of one of the displayed values in one of the multiple current form field objects in response to user input, the new value being a predicted value based on generated likelihood assessments and the user input.

85. The software product of claim 84, wherein generating likelihood assessments comprises:
   generating at least two likelihood assessments for each of the possible values; and
   aggregating the at least two likelihood assessments for each of the possible values.

86. The software product of claim 84, wherein the operations further comprise adjusting operating parameters to improve form field value prediction.

87. A method, comprising:
   storing order information for values observed in form field objects;
   generating likelihood assessments for possible values to be entered in a current form field object based on a comparison of order information for values entered in a current form instance with the stored order information for the observed values, the likelihood assessments indicating relative probability of the possible values being entered in the current form field object; and
   providing the generated likelihood assessments and the possible values for use in predicting a value for the current form field object.

88. The method of claim 87, wherein storing order information for the observed values comprises retaining form tab order information for the observed values.

89. The method of claim 87, wherein generating likelihood assessments for possible values further comprises generating a likelihood assessment for a possible value, the likelihood assessment being proportional to a degree of match between a first ordered set and a second ordered set, the first ordered set corresponding to a portion of the stored order information for the possible value, and the second ordered set corresponding to the possible value plus values entered in the current form instance before the current form field object; and the operations further comprising, before predicting a value for the current form field object:
   adjusting the generated likelihood assessments based on a determined characteristic of the current form field object, and
   adjusting the generated likelihood assessments based on a determined characteristic of the possible values.

90. A system comprising:
   one or more processors; and
   one or more storage devices storing instructions that when executed cause the one or more processors to perform operations comprising:
      storing order information for values observed in form field objects;
      generating likelihood assessments for possible values to be entered in a current form field object based on a comparison of order information for values entered in a current form instance with the stored order information for the observed values, the likelihood assessments indicating relative probability of the possible values being entered in the current form field object; and
      providing the generated likelihood assessments and the possible values for use in predicting a value for the current form field object.

91. The system of claim 90, wherein storing order information for the observed values comprises retaining form tab order information for the observed values.

92. The system of claim 90, wherein generating likelihood assessments for possible values further comprises generating a likelihood assessment for a possible value, the likelihood assessment being proportional to a degree of match between a first ordered set and a second ordered set, the first ordered set corresponding to a portion of the stored order information for the possible value, and the second ordered set corresponding to the possible value plus values entered in the current form instance before the current form field object; and the operations further comprising, before predicting a value for the current form field object:
   adjusting the generated likelihood assessments based on a determined characteristic of the current form field object, and
   adjusting the generated likelihood assessments based on a determined characteristic of the possible values.

* * * * *